United States Patent [19]
Everett

[11] Patent Number: 6,022,182
[45] Date of Patent: Feb. 8, 2000

[54] TWO DIRECTIONAL INDUSTRIAL SIDELIFT TRUCK WITH ROTATABLE CAB

[75] Inventor: William G. Everett, Bedfordshire, United Kingdom

[73] Assignee: Boss Group Limited, Bedfordshire, United Kingdom

[21] Appl. No.: 09/054,881

[22] Filed: Apr. 3, 1998

[30]     Foreign Application Priority Data

Apr. 8, 1997 [GB]  United Kingdom ............... 9707158

[51] Int. Cl.$^7$ .................................................. B60P 1/46
[52] U.S. Cl. .................. 414/544; 296/190.05; 414/667; 414/671; 187/222
[58] Field of Search ................ 296/190.08, 190.06; 180/89.13, 89.14; 187/222, 226, 227; 254/2 R; 414/914, 540, 544, 667, 671

[56]               References Cited

U.S. PATENT DOCUMENTS

| | | | |
|---|---|---|---|
| 3,168,956 | 2/1965 | Jinks et al. ............................ | 414/544 |
| 3,254,900 | 6/1966 | Allen .................................... | 414/544 X |
| 3,259,257 | 7/1966 | Brown et al. ......................... | 414/544 |
| 3,398,984 | 8/1968 | Ajero ................................... | 414/544 X |
| 3,595,409 | 7/1971 | Bowman-Shaw ..................... | 414/544 |
| 3,884,321 | 5/1975 | Drake et al. . | |
| 3,963,132 | 6/1976 | Dufour .......................... | 296/190.05 X |
| 4,790,711 | 12/1988 | Calaway ............................ | 414/540 X |

FOREIGN PATENT DOCUMENTS

| | | |
|---|---|---|
| 0 061 438 A1 | 9/1982 | European Pat. Off. . |
| 0 113 335 B1 | 7/1984 | European Pat. Off. . |
| 1 949 978 | 4/1970 | Germany . |
| 28 34 446 | 8/1978 | Germany . |
| 29 43 848 | 10/1979 | Germany . |
| 3024650 A1 | 6/1980 | Germany . |
| 3024664 C2 | 2/1982 | Germany . |
| 3128284 C2 | 2/1983 | Germany . |
| 3346309 A1 | 12/1983 | Germany . |
| 38 17 645 C2 | 5/1988 | Germany . |
| 297 08 637 U1 | 5/1997 | Germany . |
| 1022623 | 3/1966 | United Kingdom . |
| 1369649 | 10/1974 | United Kingdom . |
| 1461475 | 1/1977 | United Kingdom . |
| WO 92/04224 | 3/1992 | WIPO . |

OTHER PUBLICATIONS

Flurforderzeuge und Lagertechnik, IRION—Electric four way stacking truck (Sales Brochure, undated).

Primary Examiner—Frank E. Werner
Attorney, Agent, or Firm—Darby & Darby

[57]                 ABSTRACT

A sidelift truck, comprising: a main body (3) providing a load platform (5); a lifting assembly (7) for handling loads to and from the load platform (5); and a cab (9) mounted to the main body (3) and rotatable about a substantially vertical axis (X).

12 Claims, 4 Drawing Sheets

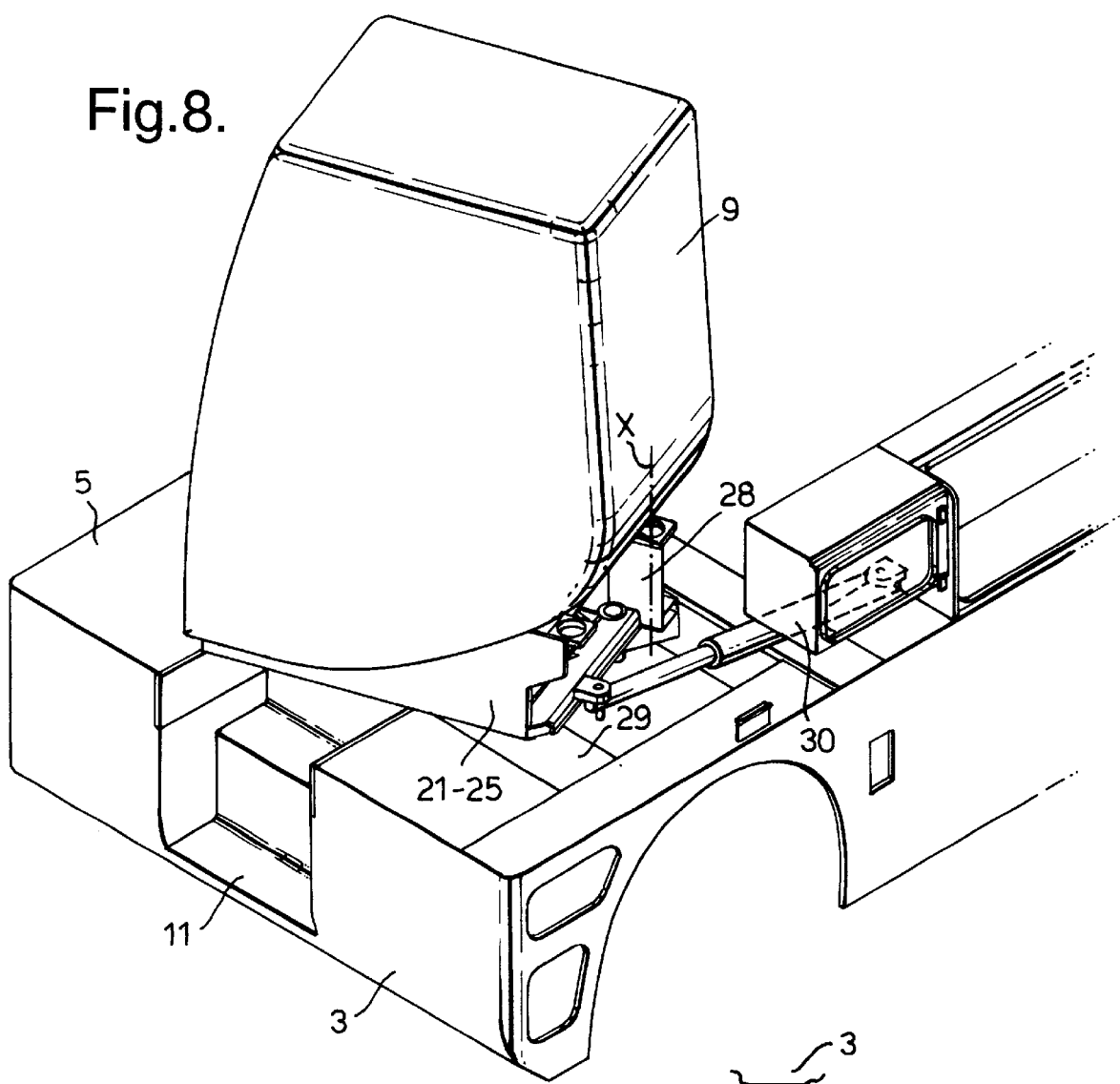
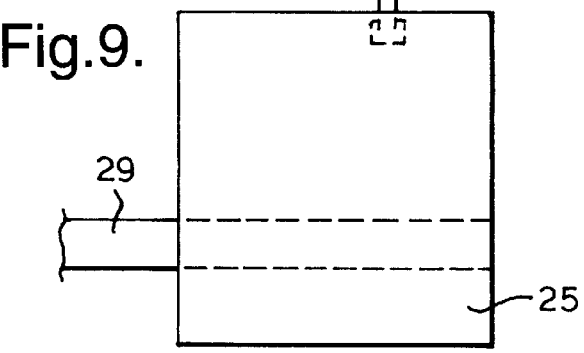

TWO DIRECTIONAL INDUSTRIAL SIDELIFT TRUCK WITH ROTATABLE CAB

FIELD OF THE INVENTION

The present invention relates to a sidelift truck which incorporates a rotatable cab.

BACKGROUND OF THE INVENTION

In two directional sidelift trucks, the cab is conventionally disposed in a fixed forwardly-facing direction to the non-lifting side of the truck. The cab is disposed the non-lifting side of the truck to maximise the width of the load carrying platform.

The provision of a cab fixed in the conventional forwardly-facing direction does however mean that an operator has to turn and look over his shoulder when performing a loading/unloading operation. This continuous stretching is awkward and fatiguing for the operators.

In addressing this problem it has been proposed to provide a rotatable seat in the cab. However, owing to the requirement for the cab to have as narrow a width as possible, the possible angle of rotation of the seat in the cab is particularly small, typically about 15°. Thus, whilst this arrangement partially overcomes the problems experienced by an operator of a conventional sidelift truck, it still requires the operator to stretch awkwardly in his seat in order clearly to see the load when performing a loading/unloading operation.

It is an aim of the present invention to provide a sidelift truck which permits an operator when sitting comfortably in the seat of the cab, to view a load clearly while performing a loading/unloading operation.

SUMMARY OF THE INVENTION

Accordingly, the present invention provides a sidelift truck, comprising: a main body providing a load platform; a lifting assembly for handling loads to and from the load platform; and a cab mounted to the main body and rotatable about a substantially vertical axis.

In a preferred embodiment, the cab is rotatable between a substantially forwardly-facing, driving position and a substantially transversely-facing, load handling position. Preferably the angle of rotation of the cab between the two positions is limited, most preferably to around 70°.

A preferred embodiment of the present invention will now be described hereinbelow by way of example only with reference to the accompanying drawings, in which:

BRIEF DESCRIPTION OF THE DRAWINGS

FIG. 8 shows an alternative cab rotating device; and

FIG. 9 shows a schematic plan view of the device of FIG. 8.

DETAILED DESCRIPTION OF THE PREFERRED EMBODIMENT

Figure 1:
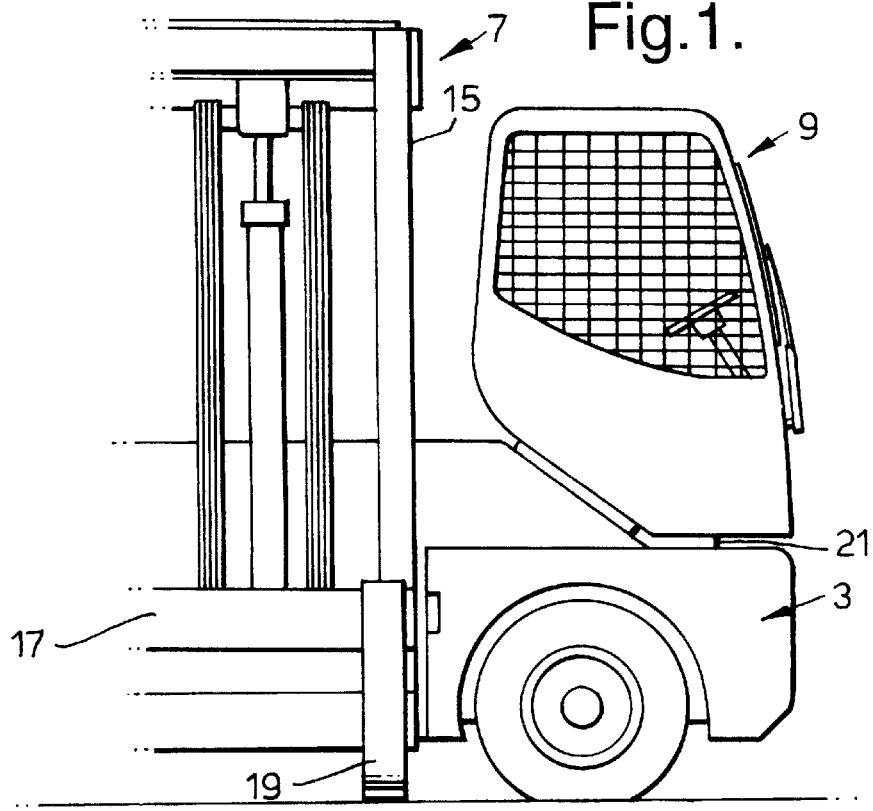
FIG. 1 shows a side view of the lifting side of the front part of a sidelift truck in accordance with a preferred embodiment of the present invention, in the parked position.
Figure 2:
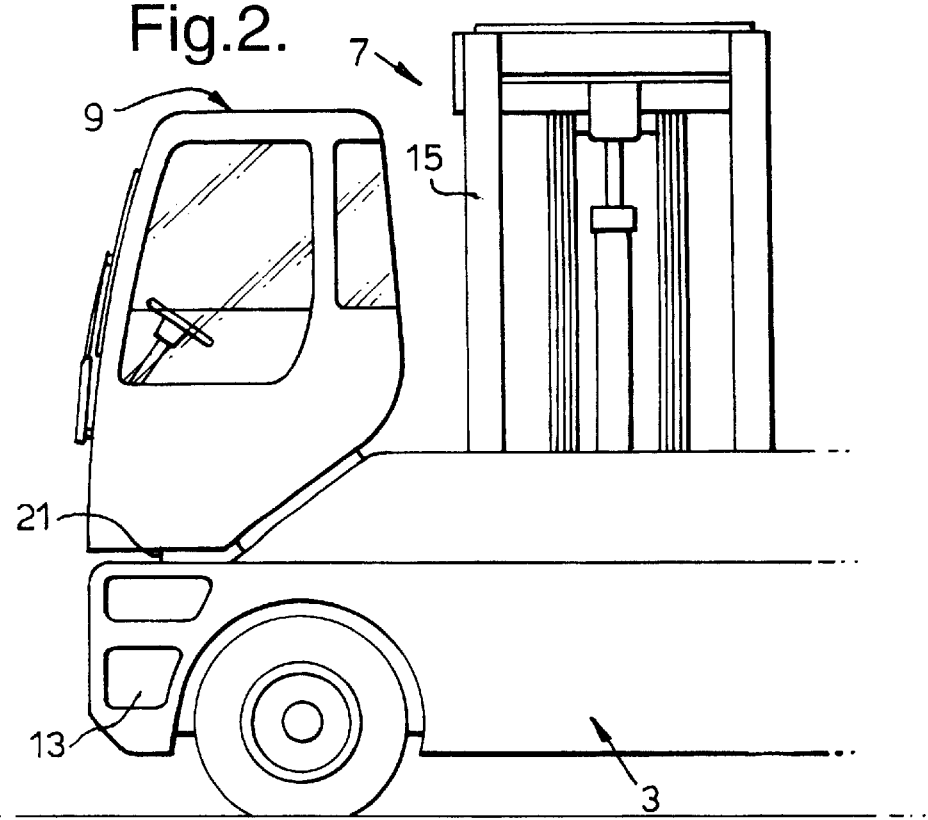
FIG. 2 shows a side view of the non-lifting side of the truck of FIG. 1 in the conventional driving position.

In a conventional manner the sidelift truck 1 of the present invention comprises an elongate main body 3 which provides a load platform 5 on a major part of the upper surface thereof, a lifting assembly 7 provided midway along the longitudinal extent of the main body 3 and a cab 9 provided adjacent the front end and the non-load handling side 3a of the main body 3.

The main body 3 is mounted on two sets of wheels at the front and rear ends and includes first steps 11 in the front end to allow an operator to climb easily onto the load platform 5 and provide access into the cab 9 when in the rotated position and second steps 13 in the non-load handling side 3a of the truck 1 to provide access into the cab 9 when in the conventional driving and working position.

Figure 4:
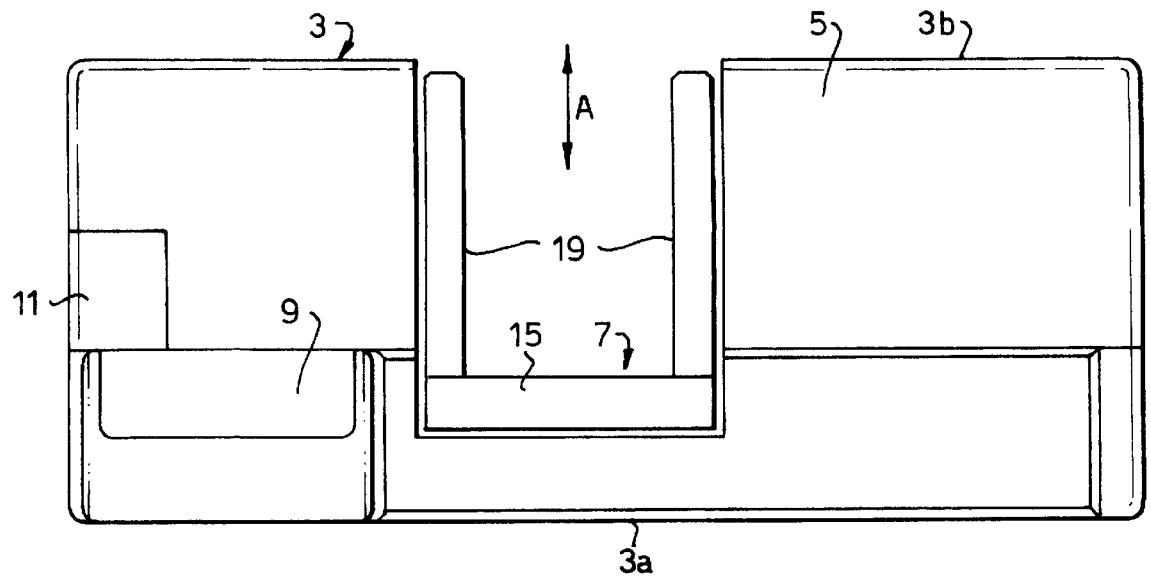
FIG. 4 shows a plan view of the truck of FIG. 1 in the conventional driving position.

The lifting assembly 7 comprises a mast 15, a carriage 17 movable up and down the mast 15, and a load-engaging member 19 supported by the carriage 17. In this embodiment the load-engaging member 19 comprises a pair of forks. The lifting assembly 7, again in a conventional manner, is extendable/retractable in the direction transverse to the longitudinal axis of the main body 3 (shown by arrow A in FIGS. 4 and 5) in order that the load-engaging member 19 can be extended beyond the load handling side 3b of the main body 3 to engage a load and retracted so as to allow the load to be brought back onto the load platform 5.

Figure 5:
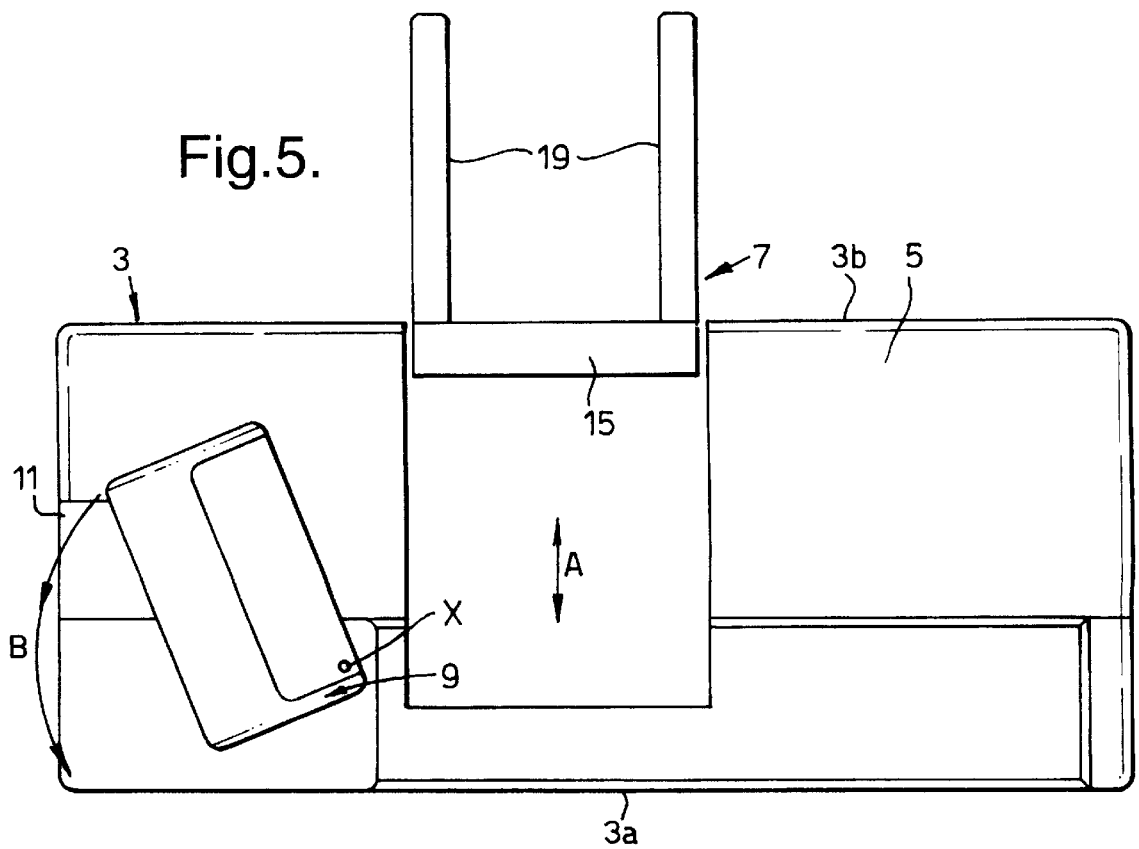
FIG. 5 shows a plan view of the truck of FIG. 1 with the cab in the load handling position.

The cab 9 is rotatable about a substantially vertical axis X from a forwardly-facing, driving and working position (shown in FIGS. 1 to 4) to a substantially transversely-facing, load handling position (shown in FIG. 5). The cab 9 has a substantially rectangular base, with the long side of the base being directed front-to-rear when the cab 9 is in the conventional driving and working position. The axis of rotation X of the cab 9 is disposed rearwardly of the mid-point of the long side of the cab 9 and inwardly of the mid-point of the narrow side of the cab 9 towards the load handling side 3b of the truck 1. In this way the cab 9 does not extend beyond the non-load handling side 3a of the truck 1 during rotation. It will of course be understood by a person skilled in the art that where overhang of the cab 9 beyond the non-load handling side 3a of the truck 1 can be tolerated, the axis of rotation can be located in any position. In such circumstances the axis of rotation X can be located so as to be coincident with the axis corresponding to the centre of gravity of the cab 9 when occupied such that minimum bending moments are applied.

Figure 6:
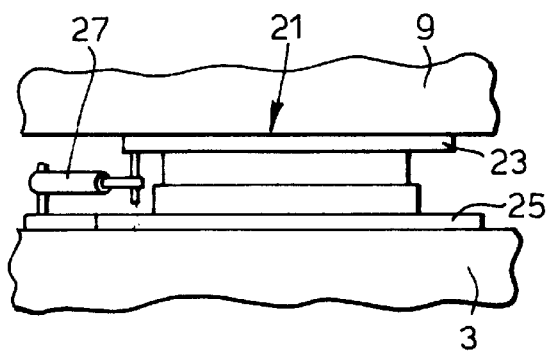
FIG. 6 shows a side view of the cab rotating device of the truck of FIG. 1.
Figure 7:
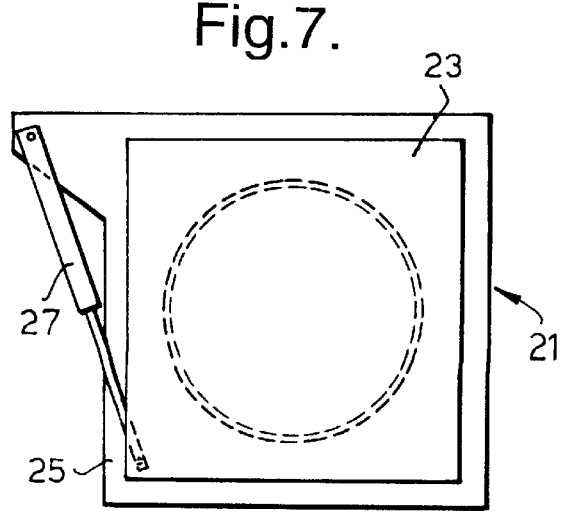
FIG. 7 shows a plan view of the cab rotating device of FIG. 6.

The cab 9 is mounted to the upper surface of the main body 3 by a cab rotating device 21. FIGS. 6 and 7 show side and plan views of the cab rotating device 21. The cab rotating device 21 comprises a pair of mutually rotatable supporting plates 23, 25 which are attached respectively to the underside of the cab 9 and the upper surface of the main body 3. The supporting plates 23, 25 are rotatable in relation to one another, in this embodiment through an angle of about 70°, which limits of rotation correspond to the driving position and the load handling position. An angle of rotation of about 70° has been found to be the ideal angle of rotation from the forwardly-facing conventional driving position, which allows the operator a clear view of the load in the load handling position. The cab 9 can, however, be arranged to rotate through any other angle from the conventional driving position, such as typically 90°. In this embodiment the cab rotating device 21 is operated by a hydraulic cylinder 27. Alternatively, the cab rotating device 21 could be mechanically driven by a gear assembly with associated drive motor.

The truck 1 further comprises a control unit (not shown) which includes a sensor for detecting the lateral extension of the lifting assembly 7. The control unit actuates the hydraulic cylinder 27 in response to the detected position of the lifting assembly 7, whereby extension or retraction of the lifting assembly 7 by the operator automatically causes rotation of the cab 9 in a direction towards respectively the load handling position or the conventional driving position. This operation is such that the cab 9 is rotated at a rate relating to the rate of the extension/retraction of the lifting assembly 7. In the fully retracted position of the lifting assembly 7 (as shown in FIGS. 1 to 4) the cab 9 is required to be in the conventional forwardly-facing position in order to allow the operator an unimpeded view to drive the truck 1 and also ensure that any load carried by the lifting assembly 7 does not foul against the cab 9. As the lifting assembly 7 is laterally extended by the operator the cab 9 is progressively rotated, in this embodiment in a clockwise sense, until a point is reached where the lifting assembly 7 is fully extended and the cab 9 assumes the fully rotated, substantially laterally-facing position (as shown in FIG. 5). On retraction of the lifting assembly 7 by the operator the cab 9 is rotated correspondingly in the opposite counter-clockwise sense (as shown by arrow B in FIG. 5) to the conventional driving position, rotation ensures that the load does not foul on the cab 9.

In this embodiment an override facility is also provided whereby the cab 9 can be rotated to the load handling position with the lifting assembly 7 in the retracted position when carrying no load. This feature allows the door of the cab 9, which in this embodiment is disposed on the side of the cab 9 adjacent the non-load handling side 3a of the truck 1 when in the conventional driving position, to be located in a position where the operator can enter the cab 9 from the front end of the truck 1. This arrangement allows the operator to enter and leave the cab 9 where the truck 1 is operated in confined locations. Typical examples are in the narrow aisles of a warehouse where there is only a very limited clearance on either longitudinal side of the truck 1 and when loaded on a transporter which is only just as wide as necessary to contain the truck 1.

Figure 3:
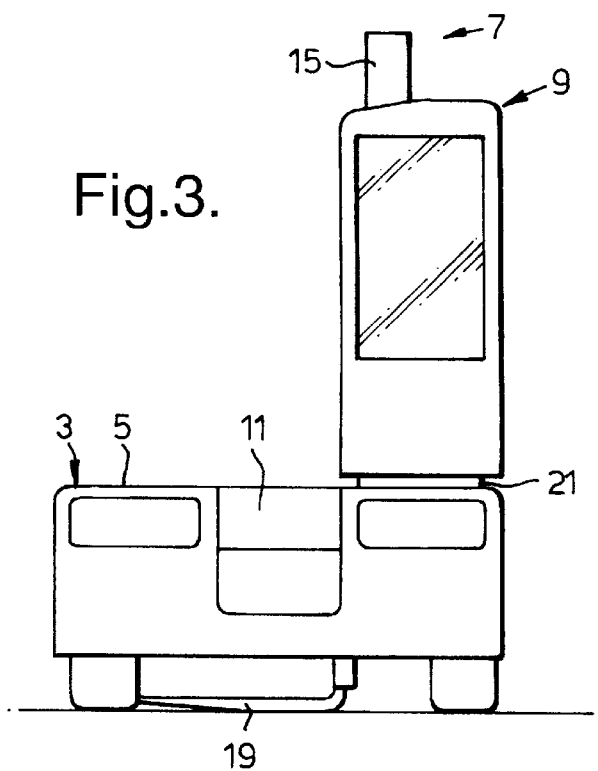
FIG. 3 shows a front view of the truck of FIG. 1 in the conventional parked position.

In use, the truck 1 is operated in every sense in a conventional manner. However, it happens that when the operator extends the lifting assembly 7 to handle a load the cab 9 rotates correspondingly towards the load handling position so as to allow the operator a full and clear view of the load to be handled. In the opposite manner, the cab 9 is automatically rotated back to the conventional driving position on retracting the lifting assembly 7. In this embodiment as shown in FIGS. 1 and 3 the load-engaging member 19 is lowered to the ground when the truck 1 is parked.

FIGS. 8 and 9 show an alternative cab rotating device. The cab 9 is rotatably mounted to the main body 3 by central pivot bearing 28 attached to the rear of the cab base (plinth) and to the upper surface of the main body. Under the cab base a load-bearing slider 29 is provided. A hydraulic cylinder is attached between the cab 9 and the body 3 rotates the cab 9 as it extends and retracts. As in the device of FIGS. 6 and 7, rotation of the cab could be limited to, e.g. around 70° or could be 90° or more.

It will be understood by a person skilled in the art that the present invention is not limited to the described embodiment but can be modified in many different ways within the scope of the appended claims.

I claim:

1. A sidelift truck, comprising:
   a main body providing a load platform and having a mounting surface;
   a lifting assembly attached to the main body and constructed to lift loads to and from the load platform and to be extendable and retractable laterally to the truck, the lifting assembly including a lifting driver to actuate lifting the loads and extending and retracting the lifting assembly;
   a cab mounted to the mounting surface of the main body and rotatable about a substantially vertical axis;
   a cab rotating device by which the cab is mounted to the mounting surface, the cab rotating device being capable of rotating the cab about the vertical axis; and
   a sensor located on the truck and in communication with the cab rotating device, whereby the sensor detects a lateral position of the lifting assembly and actuates the cab rotating device to rotate the cab based on the detected lateral position of the lifting assembly.

2. A sidelift truck according to claim 1, wherein the cab is rotatable between a substantially forwardly-facing, conventional driving position and a substantially transversely-facing, load handling position.

3. A sidelift truck according to claim 2, wherein the cab is forwardly-facing in the conventional driving position.

4. A sidelift truck according to claim 1, wherein the cab is rotatable through an angle of about 70°.

5. A sidelift truck according to claim 1, wherein the cab is mounted adjacent a non-load handling side and a front end of the truck.

6. A sidelift truck according to claim 1, wherein the cab rotating device comprises first and second relatively rotatable parts, the first part being fixed to the main body and the second part being fixed to the cab, and means for relatively rotating the first and second parts.

7. A sidelift truck according to claim 6, wherein the cab rotating device is mounted to an upper surface of the main body and a rear of the cab.

8. A sidelift truck according to claim 6, wherein the rotating means comprises a hydraulic cylinder, the hydraulic cylinder including a housing and a piston, one of the housing and the piston is fixed to the cab and the other of the housing and the piston is fixed to the main body.

9. A sidelift truck according to claim 1, wherein the axis of rotation of the cab is located such that the cab does not extend beyond a non-load handling side of the truck during rotation between a conventional driving position and a load handling position.

10. A sidelift truck according to claim 1, further comprising a control unit which includes the sensor, wherein the cab rotating device is arranged to be actuated in response to the detected position of the lifting assembly such that in a fully extended position of the lifting assembly the cab is in the load handling position and in a fully retracted position of the lifting assembly the cab is in a conventional driving position and a load carried by the lifting assembly will not contact the cab.

11. A sidelift truck according to claim 1, wherein a front end of the main body includes steps for providing access to the load platform and to the cab.

12. A sidelift truck according to claim 1, wherein the main body is an elongate body.

* * * * *